United States Patent
Oh et al.

(10) Patent No.: US 9,003,391 B2
(45) Date of Patent: Apr. 7, 2015

(54) APPARATUS AND METHOD FOR PROVIDING APPLICATION SERVICE BASED ON AREA

(75) Inventors: Hyeon Ju Oh, Daejeon (KR); Chan Yong Lee, Daejeon (KR); Eun Seon Cho, Daejeon (KR); Byung Han Ryu, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 94 days.

(21) Appl. No.: 13/538,236

(22) Filed: Jun. 29, 2012

(65) Prior Publication Data
US 2013/0007728 A1   Jan. 3, 2013

(30) Foreign Application Priority Data
Jun. 30, 2011   (KR) .................... 10-2011-0064662

(51) Int. Cl.
| | |
|---|---|
| G06F 9/44 | (2006.01) |
| G06F 9/445 | (2006.01) |
| H04W 4/02 | (2009.01) |
| H04W 4/00 | (2009.01) |

(52) U.S. Cl.
CPC .. *G06F 8/61* (2013.01); *G06F 8/62* (2013.01); *H04W 4/001* (2013.01); *H04W 4/008* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 7,593,121 B2* | 9/2009 | Kobayashi et al. | 717/174 |
| 7,624,086 B2* | 11/2009 | Keith, Jr. | 717/178 |

(Continued)

FOREIGN PATENT DOCUMENTS

| | | |
|---|---|---|
| JP | 2011-82989 | 4/2011 |
| KR | 1020090115023 | 11/2009 |
| KR | 1020100039697 | 4/2010 |

OTHER PUBLICATIONS

Motorola, "Location Based Services Best Practice", Apr. 2012, Motorola Solutions, Inc., pp. 1-21; <https://atgsupportcentral.motorolasolutions.com/content/emb/docs/manuals/72E-163233-01_LBS_Best_Practice%20%28Rev%20A%29.pdf>.*

(Continued)

*Primary Examiner* — Thuy Dao
*Assistant Examiner* — Ben C Wang
(74) *Attorney, Agent, or Firm* — Nelson Mullins Riley & Scarborough LLP; Anthony A. Laurentano, Esq.

(57) ABSTRACT

The present invention relates to a short range wireless communication device for providing an application service based on an area. In particular, an apparatus for providing an application service based on an area in a small cell including a femtocell base station or a WiFi Access Point, the apparatus including a communication unit to receive a list of application services from an Application Service Provisioning Server, select and download at least one application service from the received list, an application service database to store the at least one downloaded application service, a service controller to install the at least one downloaded application service, or uninstall an installed application service, a user equipment access detector to detect a user equipment entering or exiting a service area, and a user equipment database to store an identifier and information of the user equipment entering or exiting the service area.

15 Claims, 8 Drawing Sheets

(56) References Cited

U.S. PATENT DOCUMENTS

| | | | | |
|---|---|---|---|---|
| 8,588,818 B2* | 11/2013 | Huang et al. | | 455/456.3 |
| 2004/0261073 A1* | 12/2004 | Herle et al. | | 717/178 |
| 2005/0091635 A1* | 4/2005 | McCollum et al. | | 717/174 |
| 2006/0031830 A1* | 2/2006 | Chu et al. | | 717/174 |
| 2007/0060171 A1* | 3/2007 | Sudit et al. | | 455/456.1 |
| 2008/0072218 A1* | 3/2008 | Kwon | | 717/173 |
| 2009/0193409 A1* | 7/2009 | Dave et al. | | 717/173 |
| 2009/0286510 A1* | 11/2009 | Huber et al. | | 455/410 |
| 2010/0027521 A1* | 2/2010 | Huber et al. | | 370/338 |
| 2010/0031248 A1* | 2/2010 | Sonkin et al. | | 717/174 |
| 2010/0075697 A1* | 3/2010 | Gupta et al. | | 455/456.3 |
| 2010/0199358 A1* | 8/2010 | Yao | | 726/27 |
| 2010/0235433 A1* | 9/2010 | Ansari et al. | | 717/173 |
| 2010/0235748 A1* | 9/2010 | Johnson et al. | | 715/730 |
| 2011/0045801 A1* | 2/2011 | Parker, II | | 455/411 |
| 2011/0182250 A1* | 7/2011 | Shin et al. | | 370/329 |
| 2011/0286389 A1* | 11/2011 | Atarius et al. | | 370/328 |
| 2012/0036494 A1* | 2/2012 | Gurumohan et al. | | 717/173 |
| 2012/0088524 A1* | 4/2012 | Moldavsky et al. | | 455/456.3 |
| 2012/0113862 A1* | 5/2012 | Santhanam et al. | | 370/254 |
| 2012/0117561 A1* | 5/2012 | Lee et al. | | 717/178 |
| 2012/0276919 A1* | 11/2012 | Bi | | 455/456.1 |
| 2013/0006663 A1* | 1/2013 | Bertha et al. | | 705/3 |
| 2013/0035856 A1* | 2/2013 | Connors | | 717/173 |
| 2013/0086577 A1* | 4/2013 | Nakashima et al. | | 717/178 |
| 2013/0115872 A1* | 5/2013 | Huang et al. | | 455/3.01 |
| 2013/0159992 A1* | 6/2013 | Nuggehalli et al. | | 717/174 |
| 2013/0171932 A1* | 7/2013 | Park et al. | | 455/41.1 |
| 2014/0223423 A1* | 8/2014 | Alsina et al. | | 717/173 |

OTHER PUBLICATIONS

Balasubramanian et al., "Augmenting Mobile 3G Using WiFi", 2010 ACM, MobiSys'10, Jun. 15, 2010, San Francisco, California, USA, pp. 209-221; <http://dl.acm.org/citation.cfm?id=1814433.1814456&coll=DL&dl=GUIDE&CFID=462092452&CFTOKEN=86030066>.*

Zhuang et al., "A New Handover Mechanism for Femtocell-to-Femtocell", Oct. 25, 2012 IEEE, pp. 1-4; <http://ieeexplore.ieee.org/stamp/stamp.jsp?tp=&arnumber=6542802>.*

* cited by examiner

APPARATUS AND METHOD FOR PROVIDING APPLICATION SERVICE BASED ON AREA

CROSS-REFERENCE TO RELATED APPLICATION

This application claims the benefit of Korean Patent Application No. 10-2011-0064662, filed on Jun. 30, 2011, in the Korean Intellectual Property Office, the disclosure of which is incorporated herein by reference.

BACKGROUND

1. Field of the Invention

The present invention relates to a short range wireless communication device for providing an application service based on an area, and a manufacturing method thereof.

2. Description of the Related Art

A femtocell service may divide a cell corresponding to a service area of a mobile communication system into extremely small portions, and may connect a mobile user equipment located in a cell area to a broadband Internet network. The femtocell service may correspond to a technology for providing, through a femtocell corresponding to an ultra small cell, a mobile communication service for a significantly small area when compared to a conventional mobile communication service area.

The femtocell may correspond to a ultra small mobile communication base station used for providing a mobile convergence service by connecting a mobile phone and the Internet, and may cover an area similar to a wireless area of a wireless local area network (LAN) repeater, that is, an access point (AP).

The femtocell may be used for providing a combination of a wired and wireless audio and data service, and may correspond to a type of a location based service that automatically recognizes a relatively accurate location of a family member and whether a family member enters or exits an area, through each femtocell access.

A wireless LAN may refer to a local area wireless communication network, and may be connected to a high speed Internet by being connected to a wireless LAN repeater within a predetermined distance. The Internet may be used wirelessly through a user equipment such as a laptop, a personal computer (PC), a personal digital assistant (PDA), and the like including a wireless LAN card in an area around a 100 meter (m) radius from a point where an AP corresponding to a wireless LAN repeater is installed.

SUMMARY

An aspect of the present invention provides an apparatus and method for providing an application service based on an area to dynamically construct an application service in a small cell including a femtocell base station or a WiFi Access Point.

Another aspect of the present invention also provides an apparatus and method for providing an application service to a user equipment based on information about entering or exiting a service area of a small cell.

According to an aspect of the present invention, there is provided a small cell for providing an application service based on an area including a femtocell base station or a WiFi Access Point, the small cell including a communication unit to receive a list of application services from an Application Service Provisioning Server, select at least one application service from the received list, and download the at least one selected application service, an application service database to store the at least one downloaded application service, a service controller to install the at least one downloaded application service, or uninstall an installed application service, a user equipment access detector to detect a user equipment entering or exiting a service area, and a user equipment database to store an identifier of the user equipment entering or exiting the service area, and information about the user equipment entering or exiting the service area.

The communication unit may transmit, to the Application Service Provisioning Server, the identifier of the user equipment and the information about the user equipment entering or exiting the service area in response to detecting the user equipment entering or exiting the service area by the user equipment access detector.

The communication unit may transmit, to the Application Service Provisioning Server, information about an application service to be uninstalled, and the service controller may uninstall the corresponding application service in response to receiving a cancellation confirmation signal from the Application Service Provisioning Server.

According to another aspect of the present invention, there is provided an Application Service Provisioning Server for providing the application service based on an area, the Application Service Provisioning Server including an application service factory to store an installation file of an application service to be executed in a service area of a small cell, and provide the installation file of the application service to a user equipment entering the small cell or the service area of the small cell, an application service gateway to store information about an application service installed in or uninstalled from the small cell or the user equipment, and store information about the user equipment entering or exiting the service area, and an application service server to store an application service logic provided to the small cell or the user equipment.

The application service factory may store the application service by classifying application services into an application service according to a user equipment and an application service according to a small cell.

The application service server may include a plurality of servers according to application service items.

According to still another aspect of the present invention, there is provided a user equipment enters or exits a small cell service area, the user equipment including a communication unit to communicate with a small cell, and receive information about the user equipment entering or exiting the small cell service area, a memory unit to store an installation file for an application service received from an application service factory, and a controller to install, using the installation file for an application service that is stored in the memory unit, the corresponding application service, and uninstall an installed application service.

The controller may transmit, via the communication unit, a cancellation request signal for an installed application service, and uninstall the installed application service in response to receiving a response signal for the cancellation request signal.

According to yet another aspect of the present invention, there is provided a method of providing an application service based on an area, the method including receiving, by a small cell, a list of application services to be installed, selecting at least one application service from the received list of application services, downloading the at least one selected application service, and installing the at least one downloaded application service in the small cell.

The at least one application service may be downloaded by being classified into an application service according to a user equipment and an application service according to a small cell.

The method may further include receiving a selection of an application service to be cancelled from the at least one installed application service, transmitting, to an Application Service Provisioning Server, information about the selected application service to be cancelled, and uninstalling the application service to be cancelled in response to receiving a cancellation confirmation signal from the Application Service Provisioning Server.

The method may further include transmitting, to an Application Service Provisioning Server, information about a user equipment entering or exiting a service area in response to detecting the user equipment entering or exiting from service area, and transmitting notification information provided by an application service according to entering or exiting of the user equipment.

According to further another aspect of the present invention, there is provided a method of providing an application service based on an area, the method including receiving a list of application services by a user equipment initially entering a service area of a small cell, selecting at least one application service from the received list of application services, downloading the at least one selected application service from an application service factory, and installing the at least one downloaded application service.

The method may further include receiving a selection of an application service to be cancelled from the at least one application service, transmitting, to an Application Service Provisioning Server, information about the at least one selected application service to be cancelled, and uninstalling the at least one application service to be cancelled in response to receiving a cancellation confirmation signal from the Application Service Provisioning Server.

The method may further include comparing a list of application services to a stored list of application services in response to receiving the list of application services from the small cell when the user equipment re-enters the service area of the small cell, downloading a list of new application services according to a result of the comparison, and installing the list of new downloaded application services.

The method may further include comparing a list of application services to a stored list of application services in response to receiving the list of application services from the small cell when the user equipment re-enters the service area of the small cell, and uninstalling the corresponding application service item when a deleted application service item is included according to a result of the comparison.

According to an embodiment of the present invention, it is possible to provide an activation of a service based on a location by utilizing information about a user equipment entering or exiting a wireless service area provided by a femtocell base station or a wireless LAN repeater.

According to an embodiment of the present invention, it is possible to effectively introduce a new application service in a femtocell base station, a wireless LAN repeater, or a user equipment.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
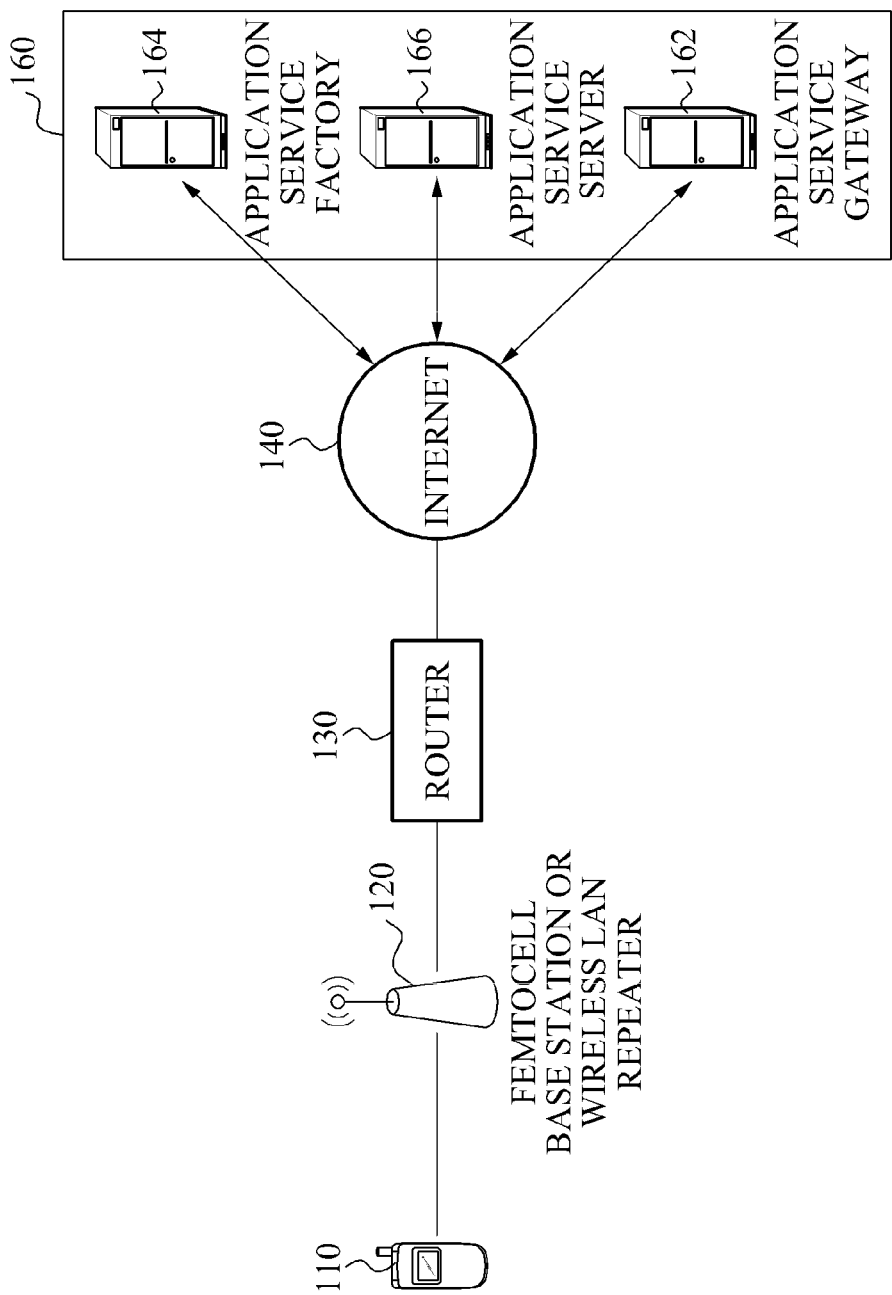
FIG. 1 is a diagram illustrating a system configuration for providing an application service based on an area according to embodiments of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a system configuration for providing an application service based on an area according to embodiments of the present invention.

Referring to FIG. 1, a system for providing an application service based on an area according to embodiments of the present invention may include a user equipment 110, a small cell 120 having a femtocell base station or a wireless local area network (LAN) repeater, a router 130, and an Application Service Provisioning Server 160.

The small cell 120 may form a service area covered by the femtocell base station or the wireless NAL repeater, and detect the user equipment 110 entering or exiting the service area. The small cell 120 may be connected to an Internet 140 through the router 130 to form a wideband wireless Internet network, and may be connected to the Application Service Provisioning Server 160 through the wideband wireless Internet network.

The Application Service Provisioning Server 160 may include an application service gateway 162, an application service factory 164, and an application service server 166.

The application service gateway 162 may manage information about selecting an application service according to the small cell 120, and information about selecting an application service according to the user equipment 110. The application service gateway 162 may manage information about the user equipment 110 entering or exiting the service area, and transmit the information to the application service server 166.

The application service factory 164 may correspond to a storage unit in which application services, to be executed in the service area covered by the small cell 120, are stored in an installation file format. The application service factory 164 may store an installation file of an application service executed in the user equipment 110 and an installation file of an application service executed in the small cell 120, separately. Thus, the application service factory 164 may transmit the corresponding application service file in response to a request for an application service from the user equipment 110 or the small cell 120.

The application service server 166 may correspond to a server performing an application service logic, and may be constructed as a single server for an application service, or a single server for a plurality of application services. The application service gateway 162, the application service factory 164, and the application service server 166 may be performed through being divided into independent Application Service Provisioning Servers, and a plurality of functions may be performed in a single server according to a system configuration.

Figure 2:
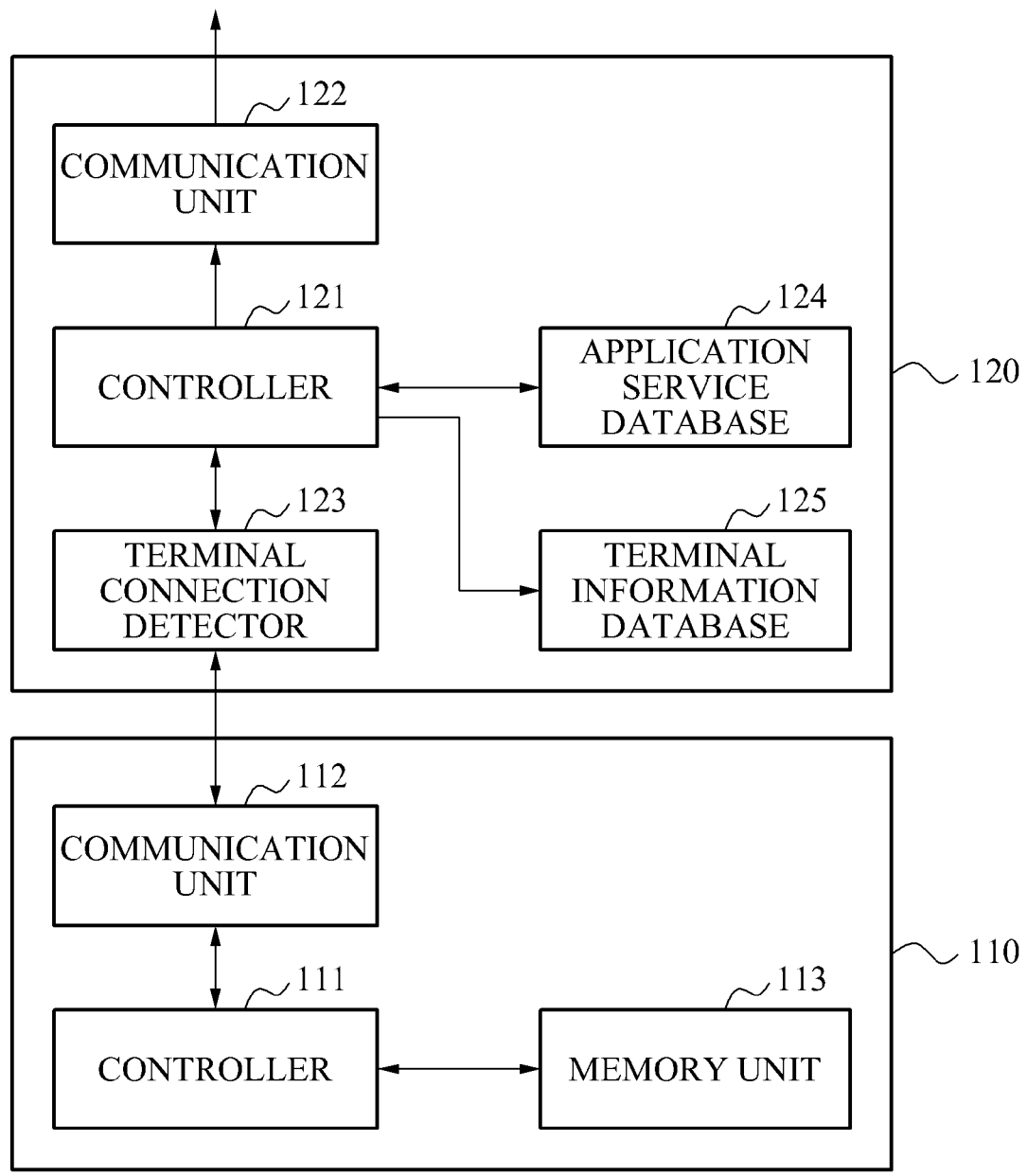
FIG. 2 is a block diagram illustrating a user equipment and a small cell according to embodiments of the present invention.

FIG. 2 is a block diagram illustrating a user equipment and a small cell according to embodiments of the present invention.

Referring to FIG. 2, a user equipment 110 according to embodiments of the present invention may include a controller 111, a communication unit 112, and a memory unit 113.

The controller 111 may install or uninstall an application service of a small cell. The controller 111 may receive, from the small cell 120, a list of application services to be performed in a service area when entering the service area. The controller 111 may extract an application service, among installed application services, to be uninstalled, and may uninstall the application service.

The controller 111 may transmit, to the small cell 120, a cancellation request signal for an application service when uninstalling the application service, receive a response signal according to the cancellation request signal, and then uninstall the application service.

The communication unit 112 may communicate with the small cell 120, and may transmit and receive an application service installed in or uninstalled from the user equipment 110, and the corresponding installation file. The memory unit 113 may store or delete an application service received from the application service factory 164.

The small cell 120 may include a controller 121, a communication unit 122, a user equipment access detector 123, an application service database 124, and a user equipment information database 125.

The controller 121 may obtain information, received from the user equipment access detector 123, about the user equipment 110 entering or exiting a service area, and may provide an application service to the user equipment 110.

The communication unit 122 may transmit and receive an application service to be installed in or uninstalled from the small cell 120, and the corresponding installation file.

The user equipment access detector 123 may detect a user equipment entering or exiting a service area, and may transmit the corresponding information to the controller 121.

The application service database 124 may store an application service and an installation file installed in the small cell 120.

The user equipment information database 125 may store information about a user equipment entering or exiting a service area.

Figure 3:
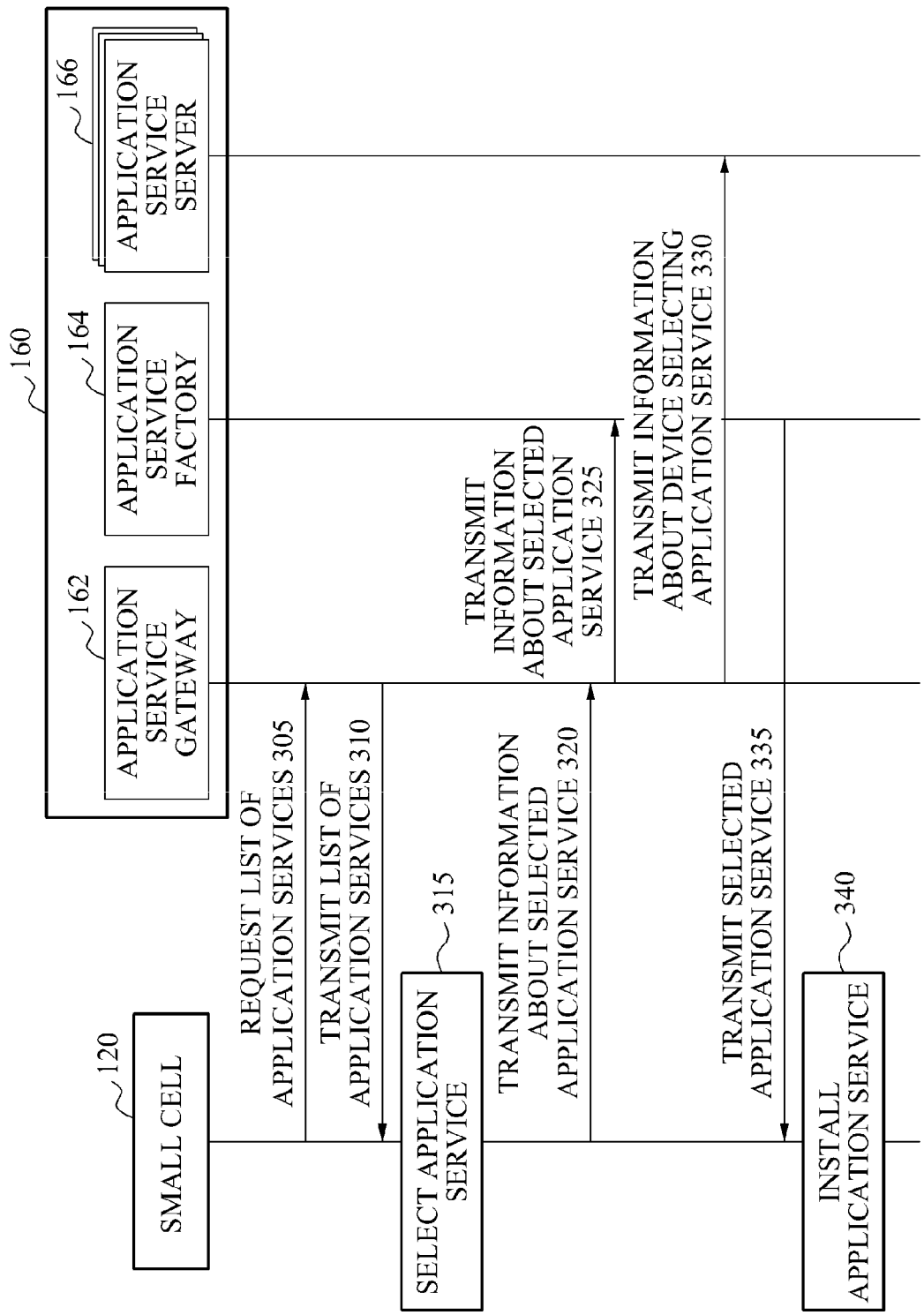
FIG. 3 is a flowchart illustrating an operation of initially constructing an application service of a small cell according to embodiments of the present invention.

FIG. 3 is a flowchart illustrating an operation of initially constructing an application service of a small cell according to embodiments of the present invention.

Referring to FIG. 3, in response to an initial device setting being completed, a small cell 120 according to embodiments of the present invention may request, for a list of application services, an application service gateway 162 of an Application Service Provisioning Server 160 in operation 305.

In operation 310, the application service gateway 162 may transmit, to the small cell 120, the list of application services requested in operation 305.

In operation 315, the small cell 120 receiving the list of application services may select an application service desired to be installed. In operation 320, the small cell 120 may transmit, to the application service gateway 162, information about the selected application service. In operation 325, the application service gateway 162 may transmit, to an application service factory 164, information about the application service selected by the small cell 120. In this instance, in operation 330, the application service gateway 162 may transmit, to an application service server 166, information about the small cell 120 selecting the application service.

In operation 335, the application service factory 164 receiving the information about the application service selected by the small cell 120 may transmit, to the small cell 120, an installation file of the selected application service. In operation 340, the small cell 120 receiving the installation file of the application service may install the application service. For an application service transmitted to the small cell 120, the application service server 166 may store information about the small cell 120 selecting the application service.

Figure 4:
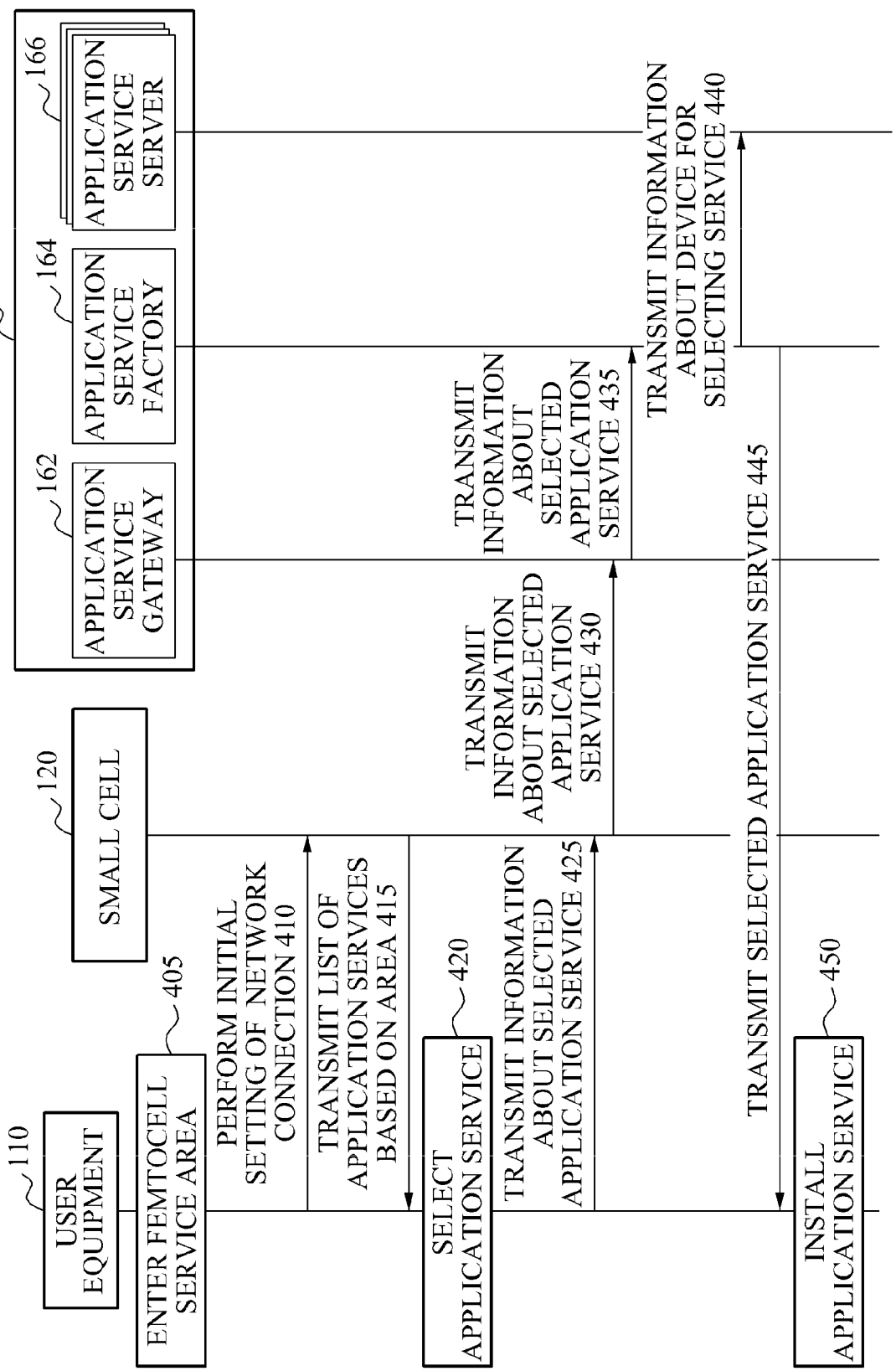
FIG. 4 is a flowchart illustrating an operation of initially constructing an application service of a user equipment according to embodiments of the present invention.

FIG. 4 is a flowchart illustrating an operation of initially constructing an application service of a user equipment according to embodiments of the present invention.

Referring to FIG. 4, in operation 405, it may be verified that a user equipment 110 initially enters a service area of a small cell 120. In operation 410, the user equipment 110 may perform an initial setting of a network access when initially entering the service area.

In operation 415, after the network access is completed, the user equipment 110 may receive, from the small cell 120, a list of application services operated in the service area.

The user equipment 110 may select an application service, from the received list of application services, to be installed and executed in operation 420, and may transmit the selected application service to the small cell 120 in operation 425.

In operation 430, the small cell 120 may transmit, to an application service gateway 162 of an Application Service Provisioning Server 160, information about the application service selected by the user equipment.

In operation 435, the application service gateway 162 may transmit, to an application service factory 164, the information about the application service received from the small cell 120. In operation 440, the application service factory 164 may transmit, to an application service server 166, information about the small cell 120 and the user equipment 110 selecting the application service.

In operation 445, the application service factory 164 may transmit an installation file about an application service to the user equipment 110 via the small cell 120 based on the information about the selected application service received from the user equipment 110 via the small cell 120.

In operation 450, the user equipment 110 may install, using the received installation file of the application service, the corresponding application service.

Figure 5:
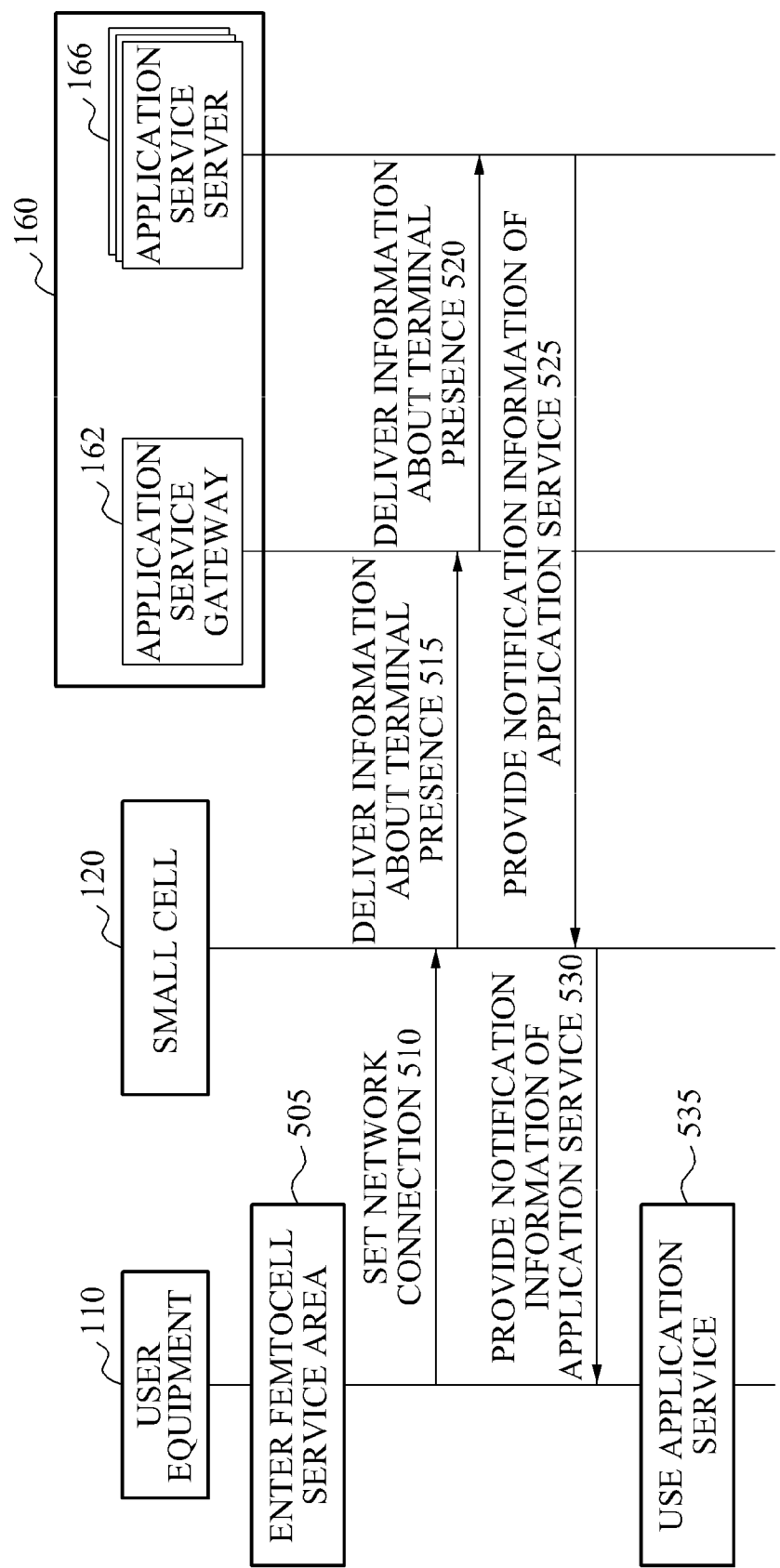
FIG. 5 is a flowchart illustrating an operation of providing an application service when a user equipment enters a service area of a small cell according to embodiments of the present invention.

FIG. 5 is a flowchart illustrating an operation of providing an application service when a user equipment enters a service area according to embodiments of the present invention.

Referring to FIG. 5, a user equipment 110 may enters a service area of a small cell 120 in operation 505, and may perform an initial setting of a network access in operation 510.

The small cell 120 may detect the user equipment 110 entering the service area, and may transmit, to an application service gateway 162, information about entering the service area including information about the user equipment 110 in operation 515.

In operation 520, the application service gateway 162 may transmit, to an application service server 166, information about the user equipment 110 entering the service area.

In operation 525, the application service server 166 may transmit, to the small cell 120, notification information an application service informs the user equipment 110.

In operation 530, the small cell 120 may deliver, to the user equipment 110, notification received from the application service server 166.

Notice information, and the like of a company may be registered as the notification information when a small cell is installed on premises of the company, and a user of the user equipment 110 enters an office of the company. When the small cell is installed in a public area such as a department store, the small cell may be used for promotional events, and the like.

Thus, the user equipment 110 may receive notification information provided in the application service in operation 530, and then use the application service in operation 535.

Figure 6:
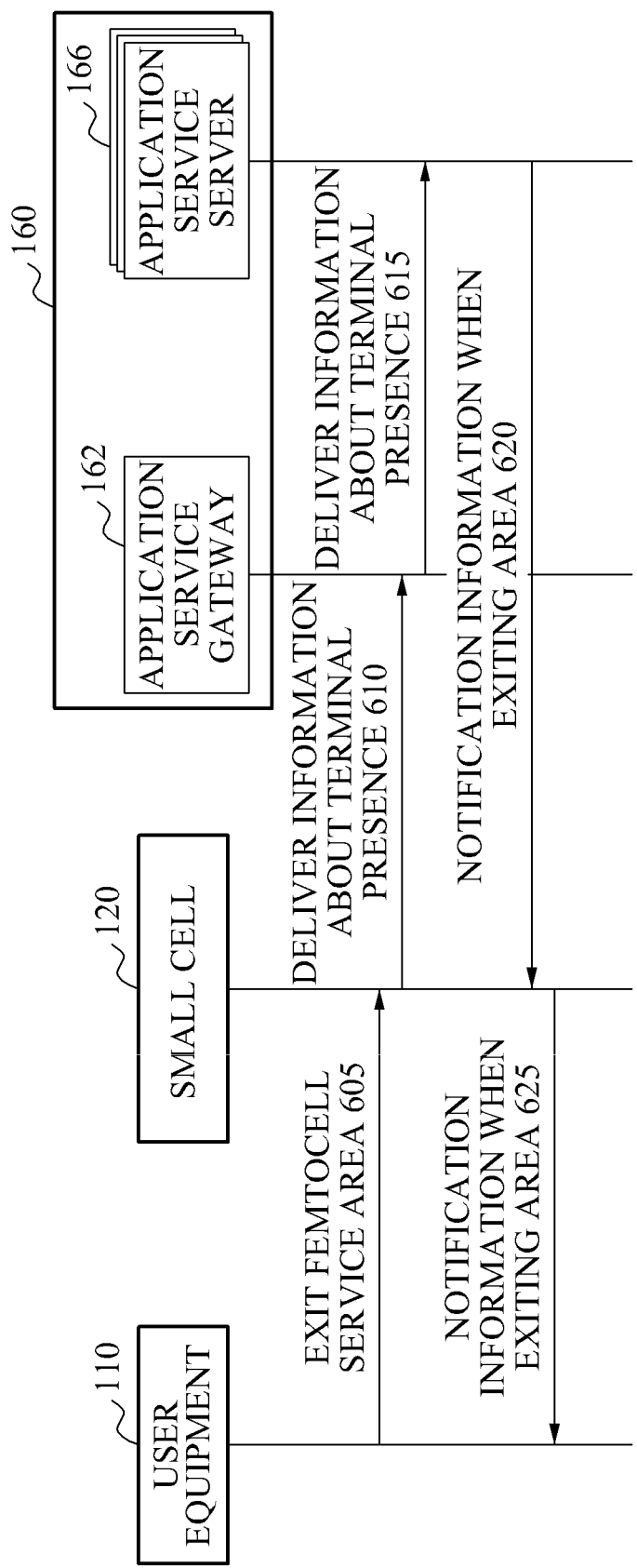
FIG. 6 is a flowchart illustrating an operation of providing an application service when a user equipment exits in a service area of a small cell according to embodiments of the present invention.

FIG. 6 is a flowchart illustrating an operation of providing an application service when a user equipment exits a service area according to embodiments of the present invention.

Referring to FIG. 6, in response to a small cell 120 detecting a user equipment 110 exiting a service area of a user equipment in operation 605, the small cell 120 may transmit information about exiting the service area to an application service gateway 162 in operation 610.

In operation 615, the application service gateway 162 may transmit, to an application service server 166, information about the user equipment 110 exiting the service area that is received from the small cell 120.

The application service server 166 may transmit notification information provided in an application service when a user equipment exits a service area.

In operation 625, the small cell 120 may transmit, to the user equipment 110, the notification information about exiting the service area that is received from the application service server 166.

Figure 7:
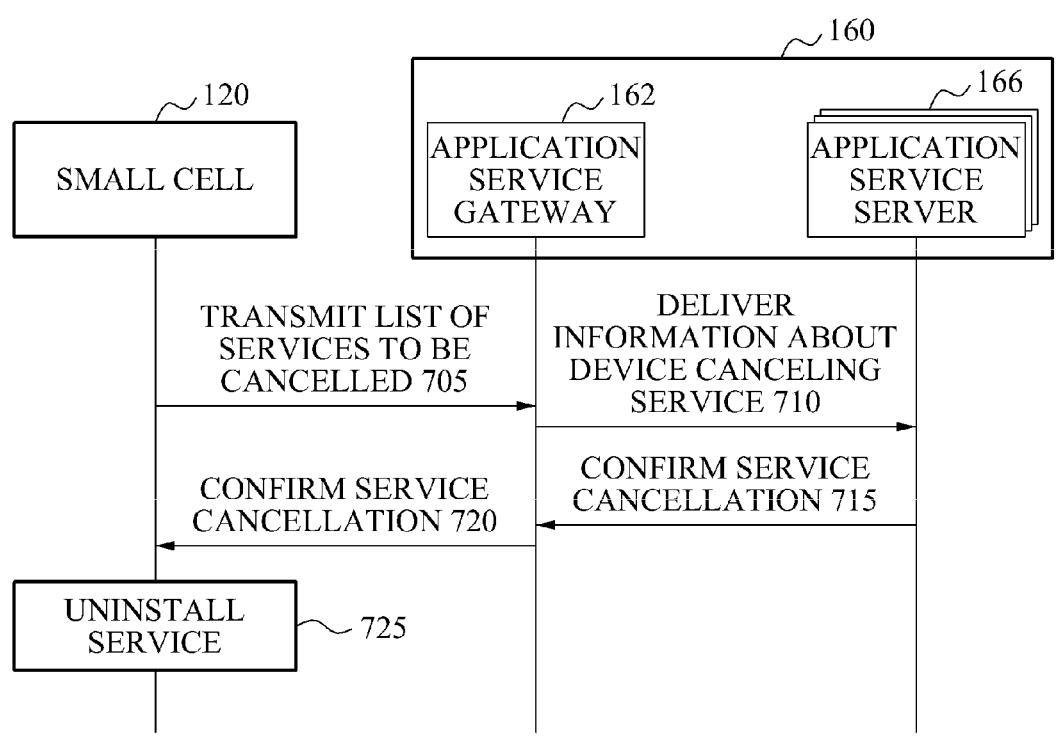
FIG. 7 is a flowchart illustrating an operation of cancelling an application service in a small cell according to embodiments of the present invention.

FIG. 7 is a flowchart illustrating an operation of cancelling an application service in a small cell and a user equipment according to embodiments of the present invention.

Referring to FIG. 7, a user equipment 110 or a small cell 120 may receive a selection of an application service, among application services being installed and serviced, desired to be cancelled. In operation 705, the small cell 120 may transmit, to an application service gateway 162, information about the selected application service.

In operation 710, the application service gateway 162 may transmit, to an application service server 166, an application service to be cancelled in the user equipment 110 or the small cell 120 or information about the user equipment 110 or the small cell 120.

In operation 715, the application service server 166 may transmit, to the application service gateway 162, a response signal for information about cancelling an application service received from the application service gateway 162.

In operation 720, the application service gateway 162 may transmit, to the small cell 120 and the user equipment 110 connected to the small cell 120, the response signal for cancelling the application service received from the application service server 166 in operation 715.

The small cell 120 or the user equipment 110 receiving the response signal for cancelling the application service may uninstall the corresponding application service.

Figure 8:
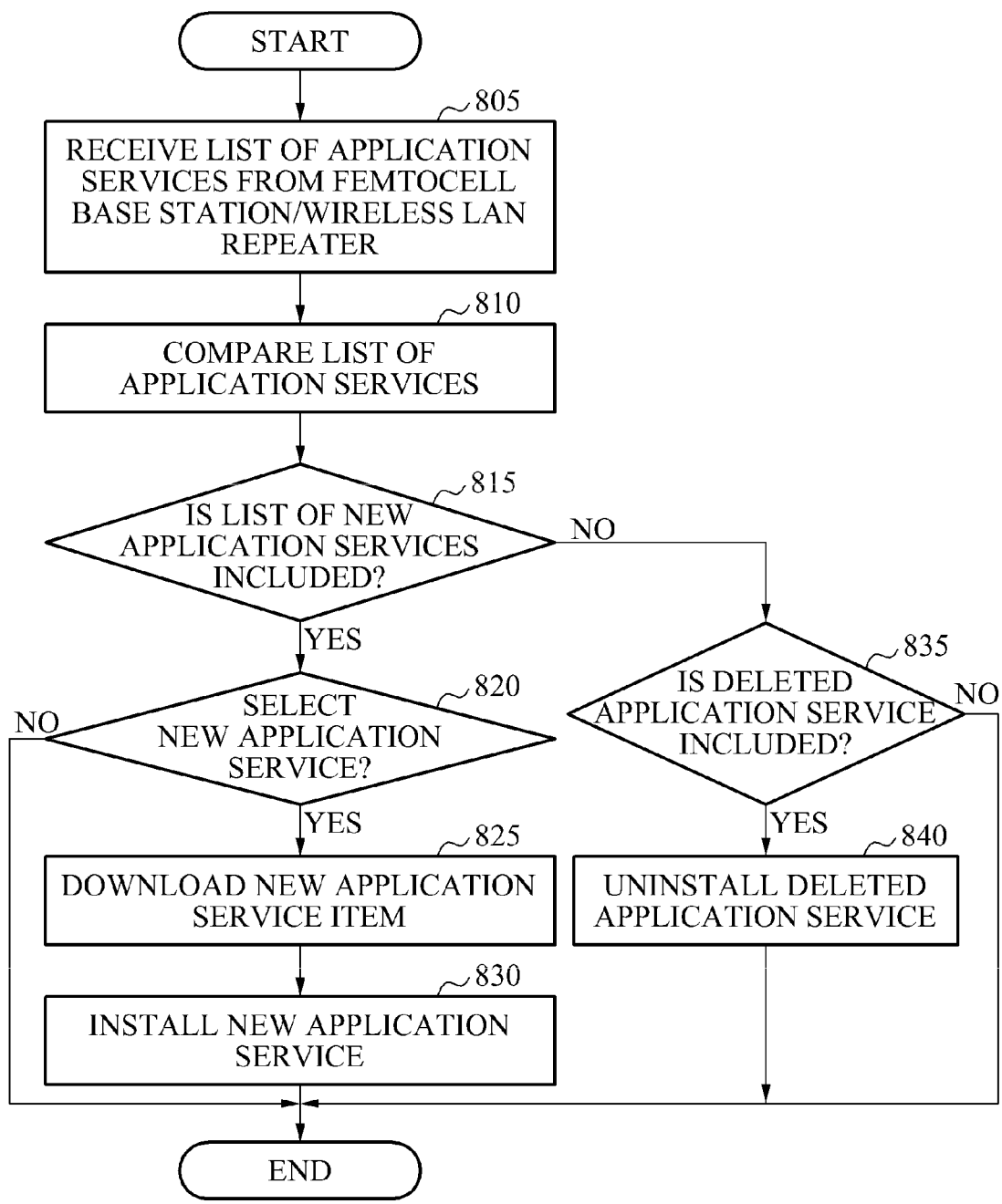
FIG. 8 is a flowchart illustrating an operation of synchronizing an application service in a user equipment according to embodiments of the present invention.

FIG. 8 is a flowchart illustrating an operation of synchronizing an application service in a user equipment according to embodiments of the present invention.

Referring to FIG. 8, in operation 805, a user equipment 110 may receive, from a small cell 120 like a femtocell base station or a wireless local area network (LAN) repeater, a list of application services currently being provided.

In operation 810, the user equipment 110 may compare the received list of application services to a list of stored or installed application services.

In operation 815, the user equipment 110 may determine whether a list of new application services is included according to a result of the comparison in operation 810. In operation 820, the user equipment 110 may determine whether to install the new application services when the new application services are included as a result of the determination in operation 815.

In operation 825, the user equipment 110 may download the new application services when the new application services are selected to be installed. In operation 830, the new application services downloaded may be installed.

In operation 835, the user equipment 110 may determine whether an application service deleted from the small cell 120 is included when the list of the new application services are excluded in operation 815. In operation 840, the user equipment 110 may uninstall a deleted application service when the user equipment 110 determines that the deleted application service is included.

The above-described exemplary embodiments of the present invention may be recorded in non-transitory computer-readable media including program instructions to implement various operations embodied by a computer. The media may also include, alone or in combination with the program instructions, data files, data structures, and the like.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of providing an application service based on an area, the method comprising:
receiving, by a small base station, a list of application services to be installed;
selecting, by the small base station, at least one application service from the received list of application services;
downloading, by the small base station, the at least one selected application service;
installing, by the small base station, the at least one downloaded application service in the small cell, or uninstalling an installed application service wherein the at least one downloaded application service in stored, and
detecting by the small base station, a user equipment entering or exiting small base station service area, wherein an identifier and information of the user equipment entering or exiting the small base station service area,
wherein the small base station transmits the information about the user equipment entering or exiting the small base station service area to the Application Service Provisioning Server, and receives notification information that the application service informs the user equipment, wherein the user equipment compares the list of application services to a stored list of application services in response to receiving the list of application services, and if a deleted application service is included in the list of the application services, the user equipment automatically uninstalls the installed application service that corresponds to the deleted application service.

2. The method of claim 1, wherein the at least one application service is downloaded by being classified into the application service according to a user equipment and the application service according to a small cell.

3. The method of claim 1, further comprising:
receiving a selection of the application service to be cancelled from the at least one installed application service;
transmitting, to the Application Service Provisioning Server, the information about the selected application service to be cancelled; and
uninstalling the application service to be cancelled in response to receiving a cancellation confirmation signal from the Application Service Provisioning Server.

4. The method of claim 1, further comprising:
transmitting, to the Application Service Provisioning Server, the information about the user equipment entering or exiting a service area in response to detecting the user equipment entering or exiting from service area; and
transmitting the notification information provided by an application service according to entering or exiting of the user equipment.

5. A method of providing an application service based on an area, the method comprising:
receiving, by a user equipment, a list of application services initially entering a service area of a small base station;
selecting, by the user equipment, at least one application service from the received list of application services;
downloading, by the user equipment, the at least one selected application service from an application service factory, wherein the at least one downloaded application service is stored;
installing, by the user equipment, the at least one downloaded application service, wherein the user equipment transmits information about the user equipment that is detected entering or exiting the service area, stores an identifier and the information of the user equipment entering or exiting the small base station service area, and receives notification information from the small base station that an application service informed the user equipment;
comparing, by the user equipment, the received list of application services to a stored list of application services in response to receiving the list of application services from the small cell when the user equipment re-enters the service area of the small cell; and
automatically uninstalling, by the user equipment, a corresponding application service item when a deleted application service item is included according to a result of the comparison.

6. The method of claim 5, further comprising:
receiving a selection of an application service to be cancelled from the at least one application service;
transmitting, to an Application Service Provisioning Server, information about the at least one selected application service to be cancelled; and
uninstalling the at least one application service to be cancelled in response to receiving a cancellation confirmation signal from the Application Service Provisioning Server.

7. The method of claim 5, further comprising:
comparing a list of application services to a stored list of application services in response to receiving the list of application services from the small cell when the user equipment re-enters the service area of the small cell;
downloading a list of new application services according to a result of the comparison; and
installing the list of new downloaded application services.

8. A small base station including a femtocell base station or a WiFi Access Point, the small base station comprising:
a processor that comprises:
a communication unit, to receive a list of application services from an Application Service Provisioning Server, select at least one application service from the received list, and download the at least one selected application service;
a service controller to install the at least one downloaded application service, or uninstall an installed application service;
a user equipment access detector to detect a user equipment entering or exiting a service area,
wherein the user equipment compares the list of application services to a stored list of application services in response to receiving the list of application services, and if a deleted application service is included in the list of the application services, the user equipment automatically uninstalls the installed application service that corresponds to the deleted application service; and a memory that comprises:
an application service database to store the at least one downloaded application service;
a user equipment database to store an identifier of the user equipment entering or exiting the service area, and information about the user equipment entering or exiting the service area,
wherein the small base station transmits the information about the user equipment entering or exiting the service area to the application service provisioning server, and receives notification information that the application service informs the user equipment.

9. The small base station of claim 8, wherein the communication unit transmits, to the Application Service Provisioning Server, the identifier of the user equipment and the information about the user equipment entering or exiting the service area in response to detecting the user equipment entering or exiting the service area by the user equipment access detector.

10. The small base station of claim 8, wherein the communication unit transmits, to the Application Service Provisioning Server, information about an application service to be uninstalled, and the service controller uninstalls the corresponding application service in response to receiving a cancellation confirmation signal from the Application Service Provisioning Server.

11. An Application Service Provisioning Server for providing the application service based on a service area, the Application Service Provisioning Server comprising:
a processor that comprises:
an application service gateway configured to transmit a list of application services to a small base station, and information about at least one application service that the small base station selects based on the list;

an application service factory configured to transmit an installation file of the at least one application service corresponding to the information; and an application service server configured to perform a logic of the application service selected and downloaded by the small base station, wherein the small base station stores the selected and downloaded application service, and uninstalls an installed application service, wherein the list of application services is transmitted to user equipment, and the user equipment compares the list of application services to a stored list of application services in response to receiving the list of application services, and if a deleted application service is included in the list of the application services, the user equipment automatically uninstalls the installed application service that corresponds to the deleted application service;

wherein the user equipment is detected entering or exiting the service area by the small base station, the Application Service Provisioning Server receives, from the small base station, the information about the user equipment entering or exiting the service area, an identifier and the information of the user equipment entering or exiting the service area of the user equipment is stored, and notification information that the application service informs the user equipment is sent to the small base station.

12. The Application Service Provisioning Server of claim 11, wherein the application service factory stores the application service by classifying application services into an application service according to the user equipment and an application service according to a small cell.

13. The Application Service Provisioning Server of claim 11, wherein the application service server includes a plurality of servers according to application service items.

14. A user equipment for entering or exiting a small cell service area, the user equipment comprising:
a processor that comprises:
 a communication unit configured to communicate with a small base station, and receive information about the user equipment which is detected entering or exiting the small service area of small base station, wherein the information is received from the small base station and sent to an application service provisioning server, wherein the small base station installs a downloaded application service or uninstalls an installed application service;
 a controller configured to install, using an installation file for an application service that is stored in a memory unit, a corresponding application service, and uninstall an installed application service,
 wherein the user equipment receives notification information from the small base station that the application service informed the user equipment,
 wherein the user equipment:
  compares a list of application services to a stored list of application services in response to receiving the list of application services, and if a deleted application service is included in the list of the application services, the user equipment automatically uninstalls the installed application service that corresponds to the deleted application service,
  has an identifier and the information of the user equipment, entering or exiting the service area, which is stored, and
  is informed by the application service, and the notification information is sent to the small base station; and
 a memory unit configured to store the installation file for the application service received from the application service provisioning server.

15. The user equipment of claim 14, wherein the controller transmits, via the communication unit, a cancellation request signal for the installed application service, and uninstalls the installed application service in response to receiving a response signal for the cancellation request signal.

* * * * *